INVENTORS R. L. BRASS
H. I. ROTHROCK, JR.
BY Lucian C. Canepa
ATTORNEY

Sept. 15, 1970 R. L. BRASS ET AL 3,529,295

DATA RETRIEVAL SYSTEM EMPLOYING AN AUTOMATIC START OF RETRIEVAL FEATURE

Filed May 17, 1967 3 Sheets-Sheet

United States Patent Office 3,529,295
Patented Sept. 15, 1970

3,529,295
DATA RETRIEVAL SYSTEM EMPLOYING AN AUTOMATIC START OF RETRIEVAL FEATURE

Robert L. Brass, Colts Neck, and Hamilton I. Rothrock, Jr., Holmdel, N.J., assignors to Bell Telephone Laboratories, Incorporated, Murray Hill and Berkeley Heights, N.J., a corporation of New York Filed May 17, 1967, Ser. No. 639,224
Int. Cl. H04j 3/14
U.S. Cl. 340—172.5 14 Claims

ABSTRACT OF THE DISCLOSURE

A data retrieval system is proposed for use by telephone information operators in retrieving telephone directory listings. The operators located at a plurality of request stations cause the generation of various characters which specify the directory listings which the operator desires to retrieve. Each group of characters generated by a particular operator is transmitted to a common time-shared information retrieval center (IRC) where they are processed to determine if a sufficient number of characters has been generated to warrant accessing a main storage file where the directory listings are stored. If it is determined that a sufficient number of characters has been generated, then retrieval of the listings is automatically initiated, otherwise, the IRC waits for the receipt of more characters. The decision as to whether or not a sufficient number of characters has been received is made by associating each received character or combination of characters from a request station with corresponding predetermined probability measures, combining these measures in an arithmetic fashion, and comparing the resultant with a threshold measure which may be varied according to the number of requests being initiated. If, upon comparison, a certain arithmetic relationship is detected, then retrieval of the listings is initiated. Otherwise, the arithmetic resultant is stored until the next character is received at which time the resultant is arithmetically combined with the probability measure associated with the new character and the process is repeated.

BACKGROUND OF THE INVENTION

Field of the invention

This invention relates to information storage and retrieval systems and more particularly to such systems in which the retrieval process is automatically initiated.

Description of the prior art

Information storage and retrieval systems in current use may be divided into two broad classifications according to the manner of gaining access to the stored information. Some systems store information at predetermined locations in memory without regard to the particular information being stored. Retrieval is then implemented by directly addressing those locations containing the desired information.

The other general type of system is that in which the retrieval of information stored in memory is implemented by matching or associating the stored information with request data. When a match occurs, the matching stored information or information associated therewith is then retrieved. This type of system may be referred to as an associative memory system.

In both of the general type systems outlined above, initiation of the retrieval of information generally requires some specific action on the part of the person or equipment making the request. Such action, for example, might be the application of a specific signal or search initiation character along with other request data to the memory or retrieving unit. In any case, the ultimate decision as to whether or not to access the memory in these systems resides with the person or equipment making the request.

One system which departs from the above general scheme for initiating retrieval is described in copending reissue application Ser. No. 637,030, filed Mar. 29, 1967 which was derived from D. W. Hagelbarger-W. G. Hall-W. A. Malthaner Pat. 3,242,470, issued Mar. 22, 1966. This system provides for the retrieval of information such as telephone number listings from a common central store. Request characters which specify the desired information are "keyed" at a plurality of operator request stations and transmitted to common retrieval equipment. These characters are then compared with a first "coarse" list of indices. When a sufficient number of request characters has been keyed so that only one index word of the "coarse" list matches the request characters, a next "finer" list of indices associated with the matching "coarse" index word is selected for comparison with subsequently keyed request characters. This process may continue using any number of levels of indices desired provided sufficient memory is available to store all the indices. After a match occurs on the final level of comparison, retrieval operations in the main storage file are initiated. Retrieval in the main storage file is then carried out on an associative basis. All information listings having portions which match the request data are retrieved.

It is evident that in the Hagelbarger et al. system, the decision to initiate retrieval is made automatically as a result of the comparison process. Thus when a sufficient number of request characters has been received, as determined by the comparison process, to adequately delimit the number of matching information listings, retrieval is initiated.

As described above, the Hagelbarger et al. system employs a type of "table look up" scheme for determining when to begin retrieval operations. This scheme requires the use of successive lists of indices with which request data is compared. For the storage and retrieval of a very large number of information listings, the memory requirement for the storage of the lists of indices could be rather severe. This is apparent because the amount of memory required (for the lists of indices) increases exponentially with an increase in the number of levels of indices (i.e., the number of levels of comparison).

SUMMARY OF THE INVENTION

It is an object of the present invention, in view of the above described prior art systems, to provide an information storage and retrieval system which includes a novel and economical arrangement for automatically initiating the start of retrieval of information.

It is another object of the present invention to provide an information storage and retrieval system comprising a decision unit for automatically determining when to begin retrieval operations according to a request-rate-dependent strategy.

These and other objects are illustrated in a specific system embodiment in which requests for information listings, which will hereafter be referred to as directory listings, are made at each of a plurality of operator request stations. Various request characters which specify the directory listings desired are generated at the request stations and transmitted to a common shared information retrieval center (IRC).

As each request character from a particular request station is received by the IRC, it is associated with an index predetermined for that character and stored in a memory. These indices are retrieved from the memory and then combined in an arithmetic fashion to obtain a resultant index. The resultant index is compared with a threshold measure which may be varied according to the number of requests being initiated. If, upon comparison, a certain arithmetic relationship is detected, retrieval of directory listings specified by the request characters is initiated. Otherwise, the arithmetic resultant is stored until a next request character is received by the IRC at which time the resultant is arithmetically combined with the index associated with the new character and the process is repeated.

Retrieval is commenced by matching the request characters with the directory listings stored in a main storage file. Those listings whose contents match the request characters are retrieved and transmitted to that request station have originated the request, where they are displayed on a cathode ray tube or otherwise utilized.

It is a feature of this invention that an information storage and retrieval system comprise a logical decision unit for processing request character indices to determine when to initiate the retrieval of information specified by the request characters.

It is another feature of this invention that the logical decision unit comprise apparatus responsive to a signal generated by a central control unit and representative of the request origination rate for varying the decision criteria utilized by the decision unit in determining when to initiate retrieval of information.

BRIEF DESCRIPTION OF THE DRAWING

A complete understanding of the present invention and of the above and other objects, features, and advantages thereof may be gained from a consideration of the following detailed description of a specific illustrative embodiment presented hereinbelow in connection with the accompanying drawing, described as follows:

FIG. 1, show a generalized information storage and retrieval system made in accordance with the principles of the present invention.

DETAILED DESCRIPTION

Referring now to FIG. 1, there is shown a plurality of operator request stations $\mathbf{100_1}$ . . . $\mathbf{100_n}$ . . . $\mathbf{200_1}$ . . . $\mathbf{200_n}$, each of which is connected via a multiplexer, data transmitting (TX) and receiving (RX) equipment, and a data channel to an information retrieval center (IRC) 118. Each request station includes apparatus (102) by which an operator may key or generate and temporarily store various request characters to identify information which the operator desires to retrieve from the IRC 118. Such apparatus is shown only for the request station $\mathbf{100_1}$. Assume for illustrative purposes that the information sought is in the form of telephone directory listings each of which might include a telephone subscriber's name, address, business class (i.e., type of business or profession) and telephone number. An operator desiring to retrieve one such listing could, for example, key various alphabetical letters of the subscriber's name, the digits of the subscriber's house number, and any other information which the operator may have available to distinguish the desired listing from the other listings. Apparatus capable of generating and temporarily storing such request characters in response to operator keying is well known in the art. Reference is made to the hereinabove cited Hagelbarger et al. patent for an illustrative showing of such apparatus.

Figure 1A:
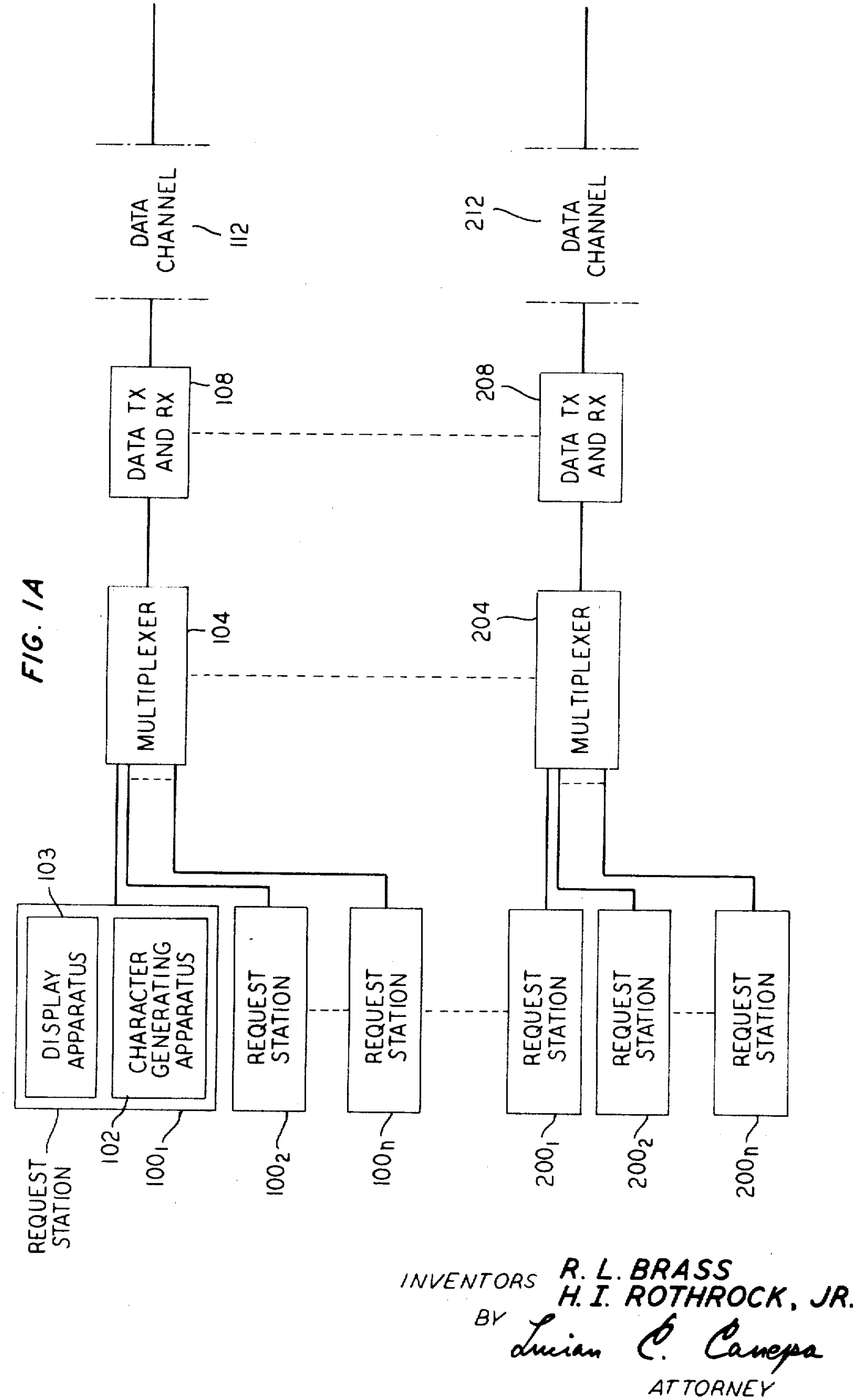
FIGS. 1A and 1B, when considered together as composite

The multiplexers 104 . . . 204 shown in FIG. 1A operate to scan the leads from the request stations to determine which stations have generated characters. The presence or absence of a signal on the leads from a particular request station respectively indicate that characters have or have not been generated. Upon detecting that request characters have been generated by a station, the multiplexer associated with that station stops the scanning process, receives the characters so generated and applies them to its associated data transmitter (TX) 108 . . . 208. After all generater characters from a particular station have been so received and applied, the scanning operation again commences. This operation is well known in the art and similar to that described in the Hagelbarger et al. patent.

All the request characters for a particular request need not be received by a multiplexer before servicing another request station. That is, a multiplexer may receive only a few of the request characters pertaining to a particular request from a request station and then go on to another request station to receive whatever characters that station has generated. The identity of origination of each of the request characters (from particular request stations) must, of course, be maintained. Illustratively, this is done by tagging each character or group of characters with a symbol identifying that character or group of characters as having been generated at a particular request station.

The request characters are then transmitted by the data transmitter via its associated data channel 112 . . . 212 to an associated data receiver (RX) 116 . . . 216. The data receiver in turn applies the characters to a buffer 120 of the IRC 118 where the characters are temporarily registered. A central control unit (CCU) 124 periodically scans the buffer 120 and reads out whatever characters are registered. Illustratively, this CCU 124 is a processor similar to that disclosed in copending patent application Ser. No. 334,875, filed Dec. 31, 1963, in the names of A. H. Doblmaier, R. W. Downing, M. P. Fabisch, J. A. Harr, H. F. May, J. S. Nowak, F. F. Taylor, and W. Ulrich. Alternatively, the unit 124 may be a general purpose computer such as that disclosed in J. L. Brown Pat. 3,036,773, issued May 29, 1962.

The CCU 124 associates each character or combination of characters with corresponding predetermined indices. These indices may either be probability measures of the characters or the logarithms of such probability measures. For illustrative purposes, it will be assumed that the indices used are the probability measures themselves.

To illustrate what the typical probability measures represent, assume that the following directory listing is sought to be retrieved:

Last name—Jones
First name—William
House number—342
Street name—Oak
City or geographic area—Rexbury
Telephone number—755–8311.

Now assume that the following request characters of the different parts of the listing shown are generated in the order shown at a request station desiring the listings:

Last name—J O N
First name—W
House number—3 4 2
City or geographic area—R.

The first character received by the CCU 124, the letter J, would be associated with a probability measure representing the "probability that the first letter of a last name is J." This probability measure would be predetermined by straightforward statistical analysis of all the listings to be stored in the system. The probability measure for the letter J in the above listing, for example, would be calculated by determining the number of listings in which the last name begins with the letter J and then dividing that number by the total number of listings. The result represents the "probability that the first letter of a last name is J." An exemplary probability measure for the letter J for one particular directory was calculated to be .03214400. What this and the other probability measures are to be used for will be discussed later. The second character received, the letter O, would be associated with a conditional probability measure representing the 'probability that the second letter of a last name is O given that the first letter is J. This conditional probability measure would also be determined beforehand by a straightforward statistical analysis. An exemplary value for this measure for the above noted telephone directory was calculated to be .51661600. Likewise the third character received, the letter N, would be associated with a conditional probability measure representing the "probability that the third letter of a last name is N given that the first two letters are JO." A typical value for this measure has been calculated to be .34279400. The remaining received characters would be associated with conditional probability measures representing the probability of each character occurring in the position of the directory listing occupied by that character given that the first three characters of the last name in the listing are JON.

The association process carried out by the CCU 124 involves simply the retrieval from a memory 126 of the different indices of the request characters described above. Other information such as where to begin searching in the main file may also be associated with certain of the request characters. This will be discussed later.

Figure 2:
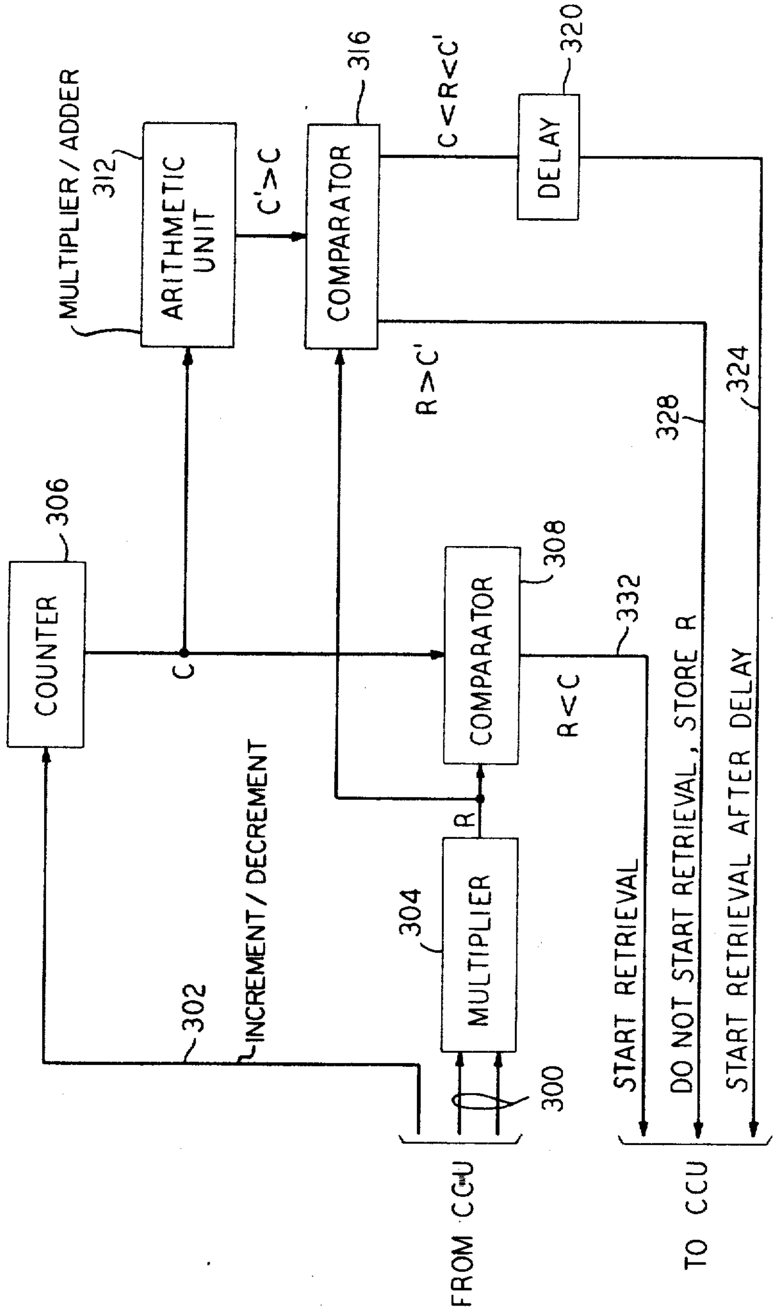
FIG. 2 shows one illustrative embodiment of the start-of-retrieval decision unit of FIG. 1B.

After receipt of the first two request characters from a request station and the retrieval of their associated indices, the CCU 124 applies the indices to a start-of-retrieval decision unit 132. These indices might illustratively be represented by binary fractional numbers which may be applied to the unit 132 as a series of pulses or in parrallel over a plurality of leads each of which represent a different binary digit or "bit" of the indices. FIG. 2 shows a detailed illustrative embodiment of the decision unit 132. This unit includes a multiplier 304 which receives the two indices applied by the CCU over leads, such as leads 300. The multiplier 304 advantageously comprises a multiplier of the type disclosed in Flores, Ivan, Computer Logic, Prentice-Hall, Inc., 1960, pp. 221–225. The multiplier multiplies the indices together to obtain a resultant R (a fractional number) which is then applied to two comparators 308 and 316 and to the CCU 124. In the example above, the probability measure associated with J (.03124400) and the conditional probability measure associated with O (.51661600) would be multiplied together to obtain a resultant $R$=.01614115. The comparator 308 compares the resultant R with the output C (also a fractional number) of a counter 306. The comparator 316 compares the resultant R with the output C′ (a fractional number) of an arithmetic unit 312. The arithmetic unit 312 simply increases the counter's output C to some value C′ either by multiplying C by a constant or by adding a constant to C. That is, the arithmetic unit 312 may alternatively be a multiplier or an adder, whichever is the choice of the system designer. The counter 306 advantageously comprises a forward-backward counter of the type described in Computer Basics, Technical Education and Management, Inc., 1962, vol. 4, pages 191–194, or of the type described in Design Manual for Transistor Circuits, edited by John M. Carroll, McGraw-Hill Book Co., Inc., 1961, pages 138 and 139. The arithmetic unit 112 advantageously comprises units of the type disclosed in the aforecited Flores text, pages 208–230. The comparator 308 and 316 advantageously comprises comparators of the type also disclosed in the Flores text, pages 190–192.

The counter 306 is maintained by the CCU 124 at a count inversely proportional to the rate of origination of requests. The CCU 124 monitors the origination of requests as part of its request character processing function and either increments or decrements the counter 306 via lead 302 when the request rate respectively decreases or increases. For example, if the request rate were less than 5000 per 15 minute period, then the CCU 124 might illustratively maintain the counter 306 at a count of .00000564. If the request rate exceeds 5000 per 15 minute period, the CCU 124 might illustratively decrease the counter to a count of .00000282. Of course, many different request rate thresholds may be used to generate a plurality of different counts.

If, upon comparison of the resultant R with the count C (which will hereafter be referred to as the variable threshold measure) by the comparator 308, it is determined that R is less than C, then the comparator 308 signals the CCU 124 via lead 332 to initiate the start of retrieval operations. The relationship between the measure C and the resultant R must be such that when $R<C$, and retrieval is initiated, the number of directory listings ultimately identified by the request characters and retrieved will be of manageable proportion (for example, less than a certain number). The retrieval process will be discussed later.

If the resultant R is found to be *greater than* C′ by the comparator 316, then the resultant R is passed via lead 328 to the CCU 124 for storage until other request characters from the request station in question are received. If the resultant R is *less than* C′, a start-of-retrieval signal is applied by the comparator 316 to a delay circuit 320 where it is delayed for a certain predetermined time before being applied to the CCU via lead 324. The delay-circuit 320 advantageously comprises a delay circuit of the type disclosed in the aforecited Flores text, pages 232–240. The purpose of delaying the signal is to allow time for possibly another request character to be received by the CCU 124 before beginning retrieval operations. (This assumes that R is also greater than C so that retrieval will not already have been initiated.) If an additional request character is received by the CCU 124 during this delay to make R less than C, then retrieval operations are immediately initiated. If no additional character is received, the start-of-retrieval signal is applied to the CCU 124 after the fixed delay and retrieval is initiated.

Assuming that the resultant R is found to be greater than C′, as mentioned above, R is passed by the comparator 316 to the CCU 124 for storage until another request character is received. Upon receipt of the next request character, the CCU 124 associates this character with its corresponding index stored in the memory 126 and then applies this index plus the previously computed resultant R to the multiplier 304 over leads such as 300 and the process described above is repeated.

As alluded to above, the system parameters C and C′ must be so determined that the start-of-retrieval decision unit 132 will cause the initiation of the retrieval operation only after a desired sufficient number of request characters have been generated. This requires a determination of the probabilities of occurrence of the various request characters (including conditional probabilities as discussed earlier). If the probability of occurrence of a particular request character is low, this indicates that there are few directory listings containing that character in the position in question. Thus when the probability of occurrence of a combination of generated characters is sufficiently low (as denoted by the resultant R) indicating that there is a sufficiently limited number of directory listings identified by these characters, the retrieval operation is initiated. So, when $R<C$, retrieval is initiated.

A second threshold measure C′, which is larger than the measure C, is employed to define a range of values for R, which indicates that although a sufficient number of request characters has been generated to ordinarily retrieve information, it would be desirable if more request characters were generated. Thus when R is greater than C but less than C′, the start-of-retrieval signal is delayed to allow time for possibly another request character to be generated. The additional request character will, of course, aid in more definitely specifying the desired listing.

Figure 1B:
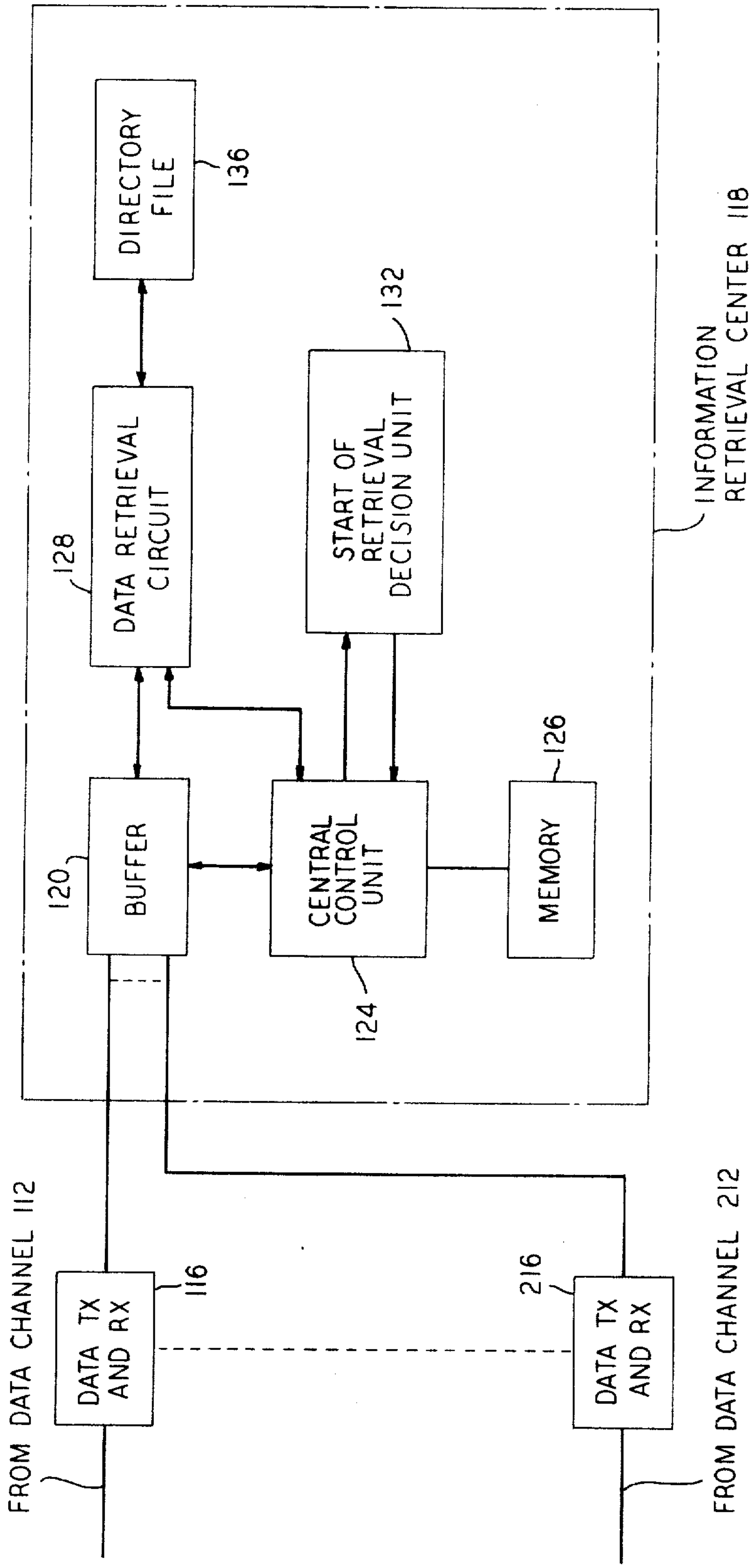

After the CCU 124 receives a start-of-retrieval signal from the start-of-retrieval decision unit 132, it applies all request characters received from the request station to a data retrieval circuit 128 (FIG. 1B). The data retrieval circuit 128 then commences to retrieve from a directory file 136 those listings whose contents match the request characters. Data storage and retrieval apparatus which could be utilized for the data retrieval circuit 128 and the directory file 136 is well known in the art. In this connection, reference is made to the hereinabove cited Hagelbarger et al. patent and to the retrieval apparatus disclosed by R. E. Machol, Jr. in copending application Ser. No. 596,934, filed Nov. 25, 1966.

The portion of the directory file 136 to be searched by the retrieval circuitry is specified by the CCU 124. The CCU 124 determines what portion of the file 136 is to be searched by associating *certain* combinations of request characters with what might be called directory file address indices stored in the memory 126. Each file address index specifies where in the directory file to obtain listings containing the request characters associated with that index. It is apparent that *all* request character combinations could not economically be associated with such indices since the number of possible combinations would be extremely high. On the other hand, it is desirable to utilize as many request characters (and thus request character combinations) as is economically possible since the listings can be more specifically identified if more request characters are employed. In other words, as the number of request characters employed increases, the number of listings which contain those characters decreases and thus the portion of the directory file which need be searched decreases.

The file address indices might advantageously be stored along with the probability measures of the request characters. Since memory locations must be provided for storing the conditional probabilities of certain combinations of request characters, it is desirable to also provide for associating file address indices with these combinations and to store such indices in these locations. Little additional memory is required with such a scheme. Thus for the directory listing example given earlier, the letter W, of the first name William, would be associated with an index indicating where in the directory file to search for listings containing last names whose first three letters are JON, and first names whose first letter is W.

After the data retrieval circuit 128 retrieves the data listings specified by the request characters, these listings are transferred to the buffer 120 under the control of the CCU 124. The buffer 120, in turn, transmits the retrieved listings to the appropriate one of the data transmitters (TX) 116 . . . 216. The data transmitter then transmits the listings via a data channel, a data receiver and a multiplexer to the requesting station where they may be displayer or otherwise utilized by the request station. Display apparatus (103) is shown only for the request station $\mathbf{100_1}$.

A number of different procedures may be utilized in retrieving the directory listings from the directory file 136. In one procedure, all data listings whose contents match the request characters would be retrieved during a single access by the data retrieval circuit 128. These listings would be stored in memory associated with the data retrieval circuit 128 and the central control unit 124 (not specifically shown) and transmitted to the requesting station in groups which the station could handle (e.g., in groups which could be displayed on a cathode ray tube). Once the desired listing was obtained, any listings remaining in memory would be erased at the initiation of the request station. This would all be under the control of the CCU 124.

An alternative procedure would be to retrieve the data listings specified by the request characters in several separate accessing operations by the data retrieval circuit 128. During each access, the retrieval circuit 128 would retrieve no more listings than could be utilized by the request station as a single group. Information indicating which part of the directory file had been searched by the data retrieval circuitry on any particular access would be stored by the CCU 124 as would the request characters used in the retrieval operation. Then if the desired listing were not among the first group of listings retrieved and transmitted to the requesting station, a second retrieval access would be commenced at the initiation of the requesting station. The retrieval circuit 128 would commence to search the directory file 136 at the location at which the first retrieval access had terminated and, of course, using the same request characters initially generated. This procedure would continue until the desired listing was obtained.

Utilization of the variable threshold arrangement (i.e., the counter 306) is especially useful with the last mentioned procedure since during periods of high numbers of requests, the number of data retrieval circuit accesses to the directory file would be reduced, thus cutting down on accessing time.

It is noted that detailed circuit canfigurations for the units 108 . . . 208, 116 . . . 216, 120 and 126, shown in FIG. 1 have not been given herein because their arrangements are considered to be clearly within the skill of the art. Illustrative detailed configurations for implementing the units $\mathbf{100_1}$, $\mathbf{100_2}$ . . . $\mathbf{100_n}$ . . . $\mathbf{200_1}$, $\mathbf{200_2}$ . . . $\mathbf{200_n}$, 104 . . . 204, 124, 128, and 136 of FIG. 1 and 306 of FIG. 2 have already been given hereinabove.

Finally, it is to be understood that the above described arrangements are only illustrative of the applications of the principles of the present invention. Numerous other arrangements may be devised by those skilled in the art without departing from the spirit and scope of the invention. For example, if the request character indices utilized were logarithms of the probability measures of the request characters rather than the probability measures themselves, then the multiplier 304 and the associated circuitry of FIG. 2 would be replaced respectively by an adder and compatible circuitry for processing signals representing logarithmic functions.

What is claimed is:

1. In combination in an information storage and retrieval system,
- a storage means for storing data,
- a plurality of operator request stations each comprising
  - (a) means for generating data request characters,
  - (b) means for receiving and displaying replies thereto,
- communication means connected to said request stations for transmitting said request characters and said replies thereto,
- data retrieval means connected to said storage means for retrieving data identified by said request characters,
- controller means connected to said communication means and to said data retrieval means for receiving and registering several of said request characters, including means for generating signals representative of certain predetermined indices associated with said several request characters and means for generating signals representative of the rate of origination of requests from said plurality of stations, and
- logic means connected to said controller means for processing both said controller means generated signals according to a predetermined logical strategy including means for signalling said controller means to initiate the retrieval of data upon the occurrence of certain predetermined results of said logical processing.

2. A combination as in claim 1 wherein said logic means comprises
- counting means responsive to said signals representative of the request origination rate for maintaining a count inversely proportional to said request rate,
- multiplying means connected to said controller means for multiplying together the signals representative of said indices, and comparing means connected to said multiplying means and said counting means for comparing the resultant product generated by said multiplying means with the count maintained by said counting means, including means for signaling said controller means to initiate retrieval of data upon detecting a predetermined arithmetic relationship between said resultant and said count and means for applying said resultant product to said controller means upon detecting a predetermined arithmetic relationship between said resultant and an incrementation of said count.

3. A combination as in claim 2 further including, a memory means connected to said controller means for receiving and storing said resultant product until receipt by said controller means of another of said request characters, a means for then retrieving said resultant product by said controller means and means for applying said product along with the signal representative of the index of said another request character to said multiplying means.

4. A combination as in claim 3 wherein said logic means further comprises a delay means connected to said comparing means for delaying the retrieval signal applied by said comparing means to said controller means for a predetermined length of time in response to said comparing means detecting a second predetermined arithmetic relationship between said resultant and said incremented count.

5. A combination as in claim 1 wherein said logic means comprises a counting means responsive to said signals representative of the rate of origination of requests, for generating a signal C inversely proportional to said request rate, a multiplying means for multiplying together the signals representative of said indices, an arithmetic unit responsive to said counting means for generating a signal C′, a first comparing means connected to said multiplying means and said counting means for comparing the resultant product generated by said multiplying means with said signal C and including means for signaling said controller means to initiate retrieval of data upon detecting a certain predetermined arithmetic relationship between said resultant product and said signal C, a second comparing means connected to said multiplying means and said arithmetic unit for comparing said resultant product with said signal C′, including means for applying said resultant product to said controller means upon detecting a first predetermined arithmetic relationship between said product and said signal C′ and means for generating a signal upon detecting a second predetermined arithmetic relationship between said product and said signal C′, and a delay means for receiving said signal generated by said second comparing means to signal said controller means to initiate retrieval of data a predetermined length of time after receiving said signal from said second comparing means.

6. In combination in an information storage and retrieval system, a storage means for storing data, a plurality of operator request stations each comprising (a) means for generating data request characters, (b) means for receiving and displaying replies thereto, communication means connected to said request stations for transmitting said request characters and said replies thereto, data retrieval means connected to said storage means for retrieving data identified by said request characters, controller means connected to said communication means and to said data retrieval means for receiving and registering several said request characters and for generating signals representative of certain predetermined indices associated with said several request characters, and logic means connected to said controller means for comparing said signals with a predetermined threshold signal generated by said logic means and including means for signaling said controller means to initiate the retrieval of data when said comparison yields a predetermined result.

7. In combination in an information storage and retrieval system, a storage means for storing data, a plurality of operator request stations each comprising (a) means for generating data request characters, (b) means for receiving and displaying replies thereto, communication means connected to said request stations for transmitting said request characters and said replies thereto, data retrieval means connected to said storage means for retrieving data identified by said request characters, controller means connected to said communication means and to said data retrieval means for receiving and registering several of said request characters and for generating signals representative of certain predetermined mathematical probabilities, said probabilities representing the probability of occurrence of said several request characters, and includes means for monitoring the origination of requests, counting means responsive to said controller means for maintaining a count inversely proportional to the rate of origination of requests, said count being a decimal representation of said request origination rate, multiplying means connected to said controller means for multiplying together said probability representations, and comparator means connected to said multiplying means and said counting means for comparing the product of said multiplication with the count registered by said counting means and including means for signaling said controller means to initiate the retrieval of data specified by said several request characters when said comparison yields a predetermined result.

8. In combination in an information storage and retrieval system, a plurality of operator request stations each comprising (a) means for genearting data request characters, (b) means for receiving and displaying replies thereto, a plurality of multiplexing means each connected to a different multiplicity of said operator request stations for sequentially scanning said request stations and receiving whatever request charatcers have been generated, communication means connected to said multiplexing means for transmitting said request characters and said replies thereto, a storage means for storing data, data retrieval means connected to said storage means for retrieving data identified by said request characters, controller means connected to said communication means and to said data retrieval means for receiving and registering several of said request characters, including means for generating signals representative of certain predetermined indices associated with said several request characters and including means for generating signals representative of the rate of origination of requests, and logic means connected to said controller means, for processing said controller means generated signals according to a predetermined logical strategy and including means for signaling said controller means to initiate the retrieval of data upon the occurrence of certain predetermined results of said logical processing.

9. In an information storage and retrieval process, a method for automatically determining when to begin the retrieval of data which comprises generating data request characters, generating in response to said request characters first signals each representative of a certain predetermined index associated with a different one of said characters, generating second signals representative of the rate of origination of data retrieval requests, comparing a combination of said first signals with said second signals, and generating an initiation-of-retrieval signal upon detecting a certain predetermined arithmetic relationship between said combination of first signals and said second signals.

10. In an information storage and retrieval process, a method for automatically initiating the start of retrieval of data which comprises generating data request characters, generating in response to said request characters signals each representative of a certain predetermined index associated with a different one of said characters, combining several of said signals representative of said indices in an arithmetic manner to obtain a resultant signal, generating a predetermined threshold signal, comparing said resultant signal with said threshold signal, and generating an initiation-of-retrieval signal in response to said comparison yielding a certain predetermined result.

11. A method as in claim 10 which further comprises generating an initiation-of-retrieval signal after a predetermined delay upon detecting a second predetermined arithmetic relationship between an incrementation of said threshold signal and said resultant signal.

12. In an information storage and retrieval process, a method for automatically initiating the start of retrieval of data which comprises, generating data request characters, generating in response to said request characters signals each representative of a predetermined index associated with a different one of said request characters, generating a predetermined threshold signal, multiplying together several of said signals representative of said indices to obtain a resultant product, comparing said threshold signal with said resultant product, generating an initiation-of-retrieval signal upon detecting a predetermined arithmetic relationship between said threshold signal and said product, multiplying said resultant product by an additionally generated signal representative of an index associated with an additionally generated request character upon detecting a predetermined arithmetic relationship between an incrementation of said threshold signal and said product, and repeating said comparing and product multiplying until said predetermined arithmetic relationship between said threshold signal and said product is detected.

13. A method as in claim 12 which further comprises generating an initiation-of-retrieval signal after a predetermined delay upon detecting a second predetermined arithmetic relationship between said incremented threshold signal and said product.

14. In an information storage and retrieval process, a method for retrieving data which comprises generating data request characters at a plurality of request stations, generating signals each representative of a certain predetermined index associated with a different one of said request characters, generating a predetermined threshold signal, comparing a combination of said signals representative of said indices with said threshold signal, generating an initiation-of-retrieval signal upon detecting a certain predetermined arithmetic relationship between said threshold signal and said combination of signals representative of said indices, retrieving data identified by the combination of said request characters, and displaying said retrieved data at the particular request station which shall have generated the request characters identifying said retrieved data.

References Cited

UNITED STATES PATENTS

| | | | |
|---|---|---|---|
| 3,242,470 | 3/1966 | Hagelbarger et al. | 340—172.5 |
| 3,249,919 | 5/1966 | Scantlin | 340—172.5 |
| 3,344,405 | 9/1967 | Craft et al. | 340—172.5 |
| 3,374,470 | 5/1968 | Rohland | 340—172.5 |
| 3,402,394 | 9/1968 | Koerner et al. | 340—172.5 |

OTHER REFERENCES

"On Relevance, Probalistic Indexing and Information Retrieval," by Maron et al., appearing in Journal of the Association for Computing Machinery, July 1960, pp. 216–220.

PAUL J. HENON, Primary Examiner

H. E. SPRINGBORN, Assistant Examiner